United States Patent [19]

Becktel et al.

[11] Patent Number: 5,468,137

[45] Date of Patent: Nov. 21, 1995

[54] APPARATUS FOR EXTRUDING A VISCOUS MATERIAL

[75] Inventors: David C. Becktel, East Peoria; Harry B. Newman, Washington; Phillip E. Moldenhauer, Peoria, all of Ill.

[73] Assignee: Caterpillar Inc., Peoria, Ill.

[21] Appl. No.: 106,677

[22] Filed: Aug. 16, 1993

[51] Int. Cl.[6] .................................................. B29C 47/24
[52] U.S. Cl. .................. 425/381; 264/209.2; 264/209.8; 425/381.2; 425/466; 425/467
[58] Field of Search ............................. 425/382 N, 382.3, 425/381, 376.1, 380, 381.2, 461, 466, 467; 264/173, 209.2, 209.8

[56] References Cited

U.S. PATENT DOCUMENTS

| | | | |
|---|---|---|---|
| 3,357,456 | 12/1967 | Grawey et al. | 139/127 |
| 3,574,810 | 4/1971 | Tournery et al. | 264/173 |
| 3,697,209 | 10/1972 | Schiesser | 264/173 |
| 3,697,364 | 10/1972 | Boustany et al. | 161/59 |
| 3,709,845 | 1/1973 | Boustany et al. | 260/17.4 BB |
| 3,933,960 | 1/1976 | Cameron et al. | 264/108 |
| 4,262,704 | 4/1981 | Grawey | 138/130 |
| 4,362,496 | 12/1982 | Uhlig | 425/381 |
| 4,501,629 | 2/1985 | Satzler | 156/149 |
| 4,553,922 | 11/1985 | Winner | 425/381.2 |
| 4,584,154 | 4/1986 | Cerny | 264/209.2 |
| 4,731,216 | 3/1988 | Topolski | 425/381 |
| 4,798,696 | 1/1989 | Boen Per | 425/381 |
| 4,931,237 | 6/1990 | Peelman et al. | 264/48 |
| 5,059,375 | 10/1991 | Lindsay | 264/167 |

*Primary Examiner*—Jay H. Woo
*Assistant Examiner*—Joseph Leyson
*Attorney, Agent, or Firm*—Kenneth A. Rhoads

[57] ABSTRACT

This invention relates to an apparatus for continuously extruding a viscous material having discontinuous reinforcing fibers therein. The apparatus has a rotating extruder head assembly including an extruding die having an extruding passage. A plurality of vanes extend outward from the extruding passage. In response to rotation of the extruder head assembly the fibers are orientated on a helix about a mandrel.

4 Claims, 3 Drawing Sheets

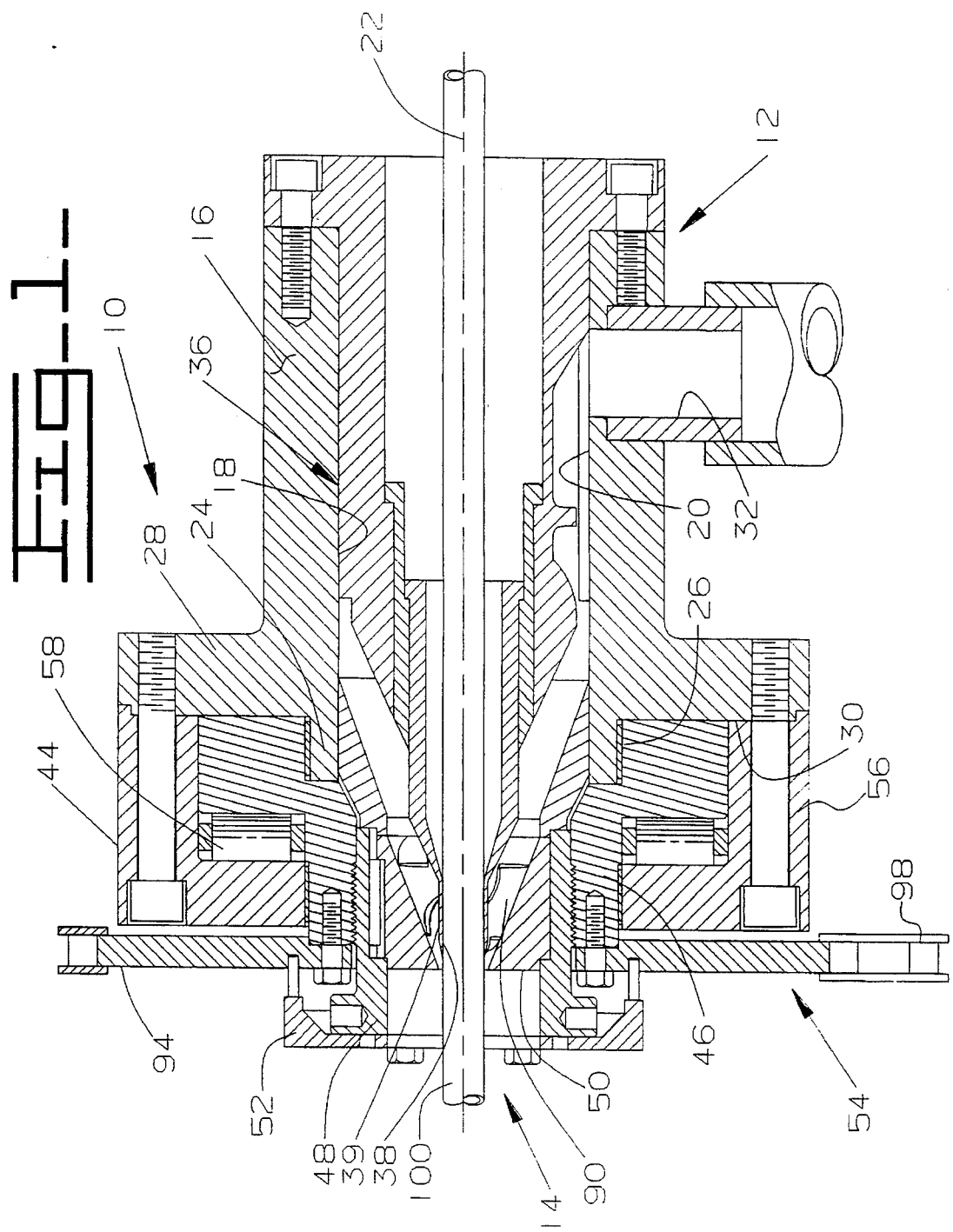

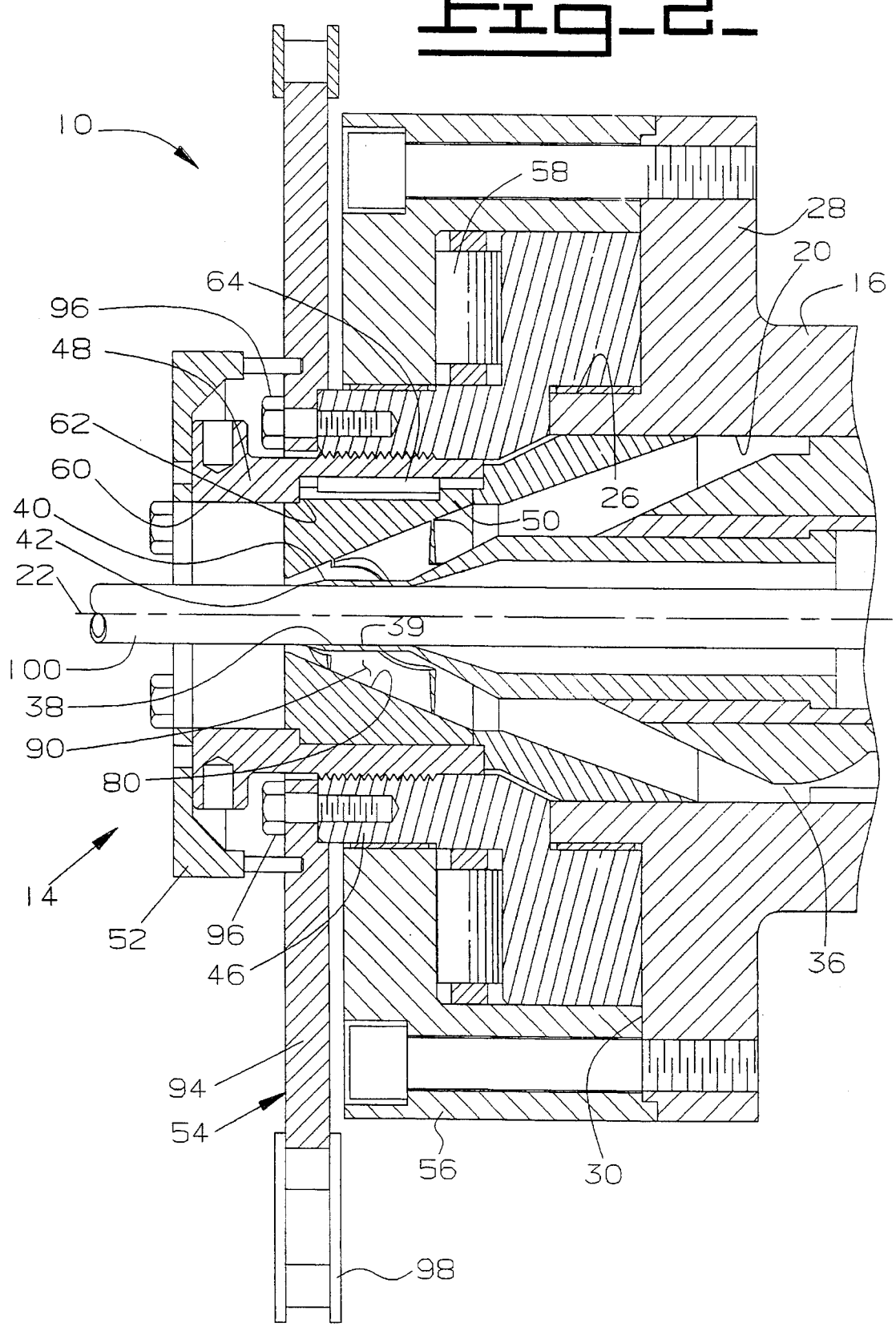
Fig_2_

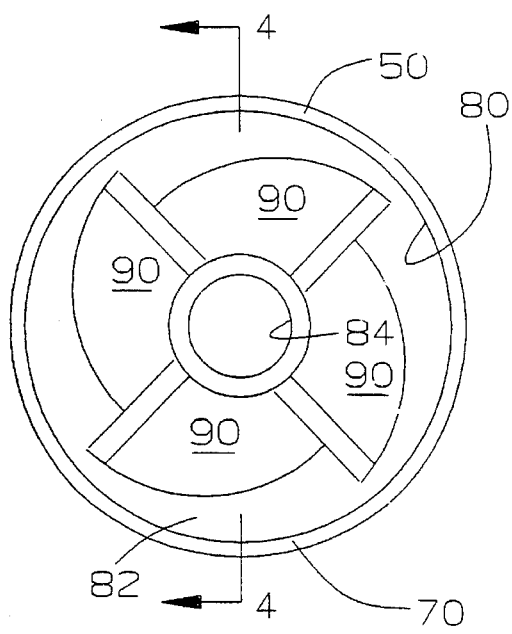
Fig-3-
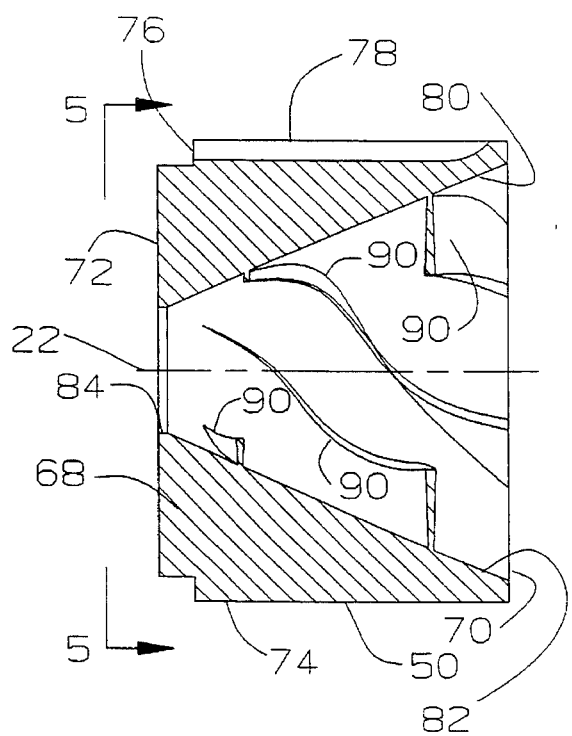
Fig-4-
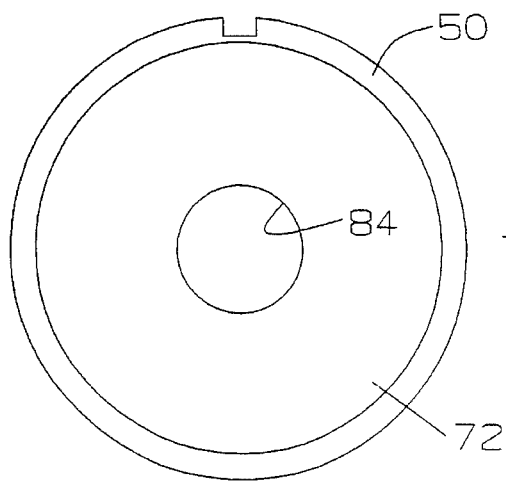
Fig-5-
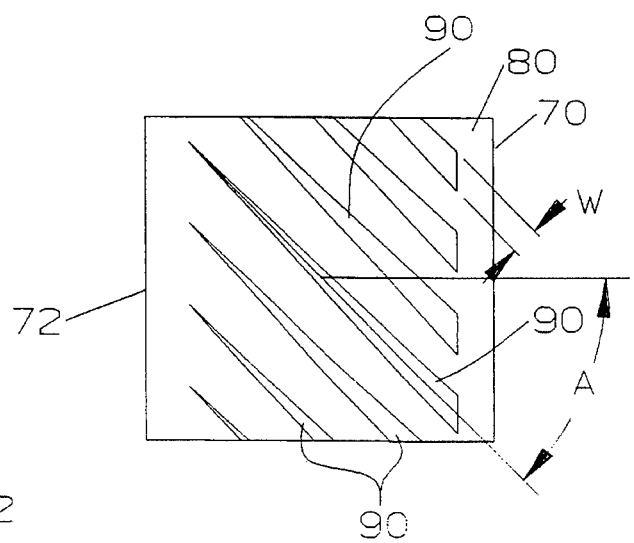
Fig-6-

APPARATUS FOR EXTRUDING A VISCOUS MATERIAL

TECHNICAL FIELD

This invention relates to an apparatus for extruding a viscous material containing discontinuous reinforcing fibers.

BACKGROUND ART

High pressure wire reinforced hydraulic hose is typically used in a variety of applications, for example, to provide a flexible connection between several moving parts of hydraulic circuits where one part must move relative to the other part. Typical reinforced hydraulic hose structures are illustrated in U.S. Pat. No. 3,357,456 which issued on Dec. 12, 1967, to C. E. Grawey; and U.S. Pat. No. 4,262,704 which issued on Apr. 21, 1981, to C. E. Grawey.

One of the critical areas of such hydraulic hose is the liner or core structure. In both of the aforementioned patents, the liner member is formed by wrapping a laminated tape in overlapping relationship on a mandrel and then winding a series of wire plies with layers of elastomer between adjacent wire plies. The laminate tape is composed of two layers of uncured elastomer with an open mesh fabric sandwiched there between. A problem associated with such a method of manufacture is that the length of the hose produced is limited by the length of the calendered laminate tape stock roll. Also undesirably, the manufacture of the laminate tape is a time consuming, labor intensive, relatively expensive multistep process that has a considerable waste by-product that cannot be recycled.

Several processes have been developed to manufacture high pressure hose on a continuous basis. An example of such a process is set forth in U.S. Pat. No. 4,501,629 which issued on Feb. 26, 1985, to R. L. Satzler. The liner is formed by extruding a viscous material onto a mandrel.

U.S. Pat. No. 3,933,960 which issued on Jan. 20, 1976, to James Cameron et al. illustrates a method of making a reinforced tube having short discontinuous fibers incorporated in the viscous material. The fibers are circumferentially orientated to provide the necessary strength to resist internal pressures. When viscous material containing discontinuous fibers is extruded, the flow will cause the fiber to orientate axially in the direction of the flow. Examples of the discontinuous reinforcing fibers are shown in U.S. Pat. No. 3,697,364 which issued to K. Boustany et al. on Oct. 10, 1972, and U.S. Pat. No. 3,709,845 which issued to K. Boustany et al. on Jan. 9, 1973.

The subject invention provides a relatively simple extruding apparatus for the manufacture of a hose liner, on a continuous basis, in which discontinuous fibers are spirally orientated within the viscous polymer material as it is being extruded around the mandrel. The extruding apparatus controls the spiral orientation of the fibers, increases the liner's radial strength, provides smooth outer peripheral surfaces, provides a liner with a constant wall thickness, and bridges the space between the wires. With such construction, there is realized a savings of equipment, labor, and natural resources.

The present invention is directed to overcome one or more of the problems as set forth above.

DISCLOSURE OF THE INVENTION

In one aspect of the invention, there is provided an apparatus for extruding viscous material containing discontinuous reinforcing fibers. The extruding apparatus has an inlet end, an outlet end, an extruding body having an inner body surface defining a body bore having an axis, and an inlet passage opening into the body bore. The extruding apparatus further includes a helicoid assembly having a helicoid bore coaxial with the axis of the body bore. An extruder head assembly is connected to the body. An extruding die defines an extruding passage. The extruding passage has an internal bore receiving the helicoid. The extruding die is connected to and rotatable with the rotating extruder head assembly. A plurality of helical vanes extend inward from the conical converging surface. A mandrel extends coaxially through the helicoid bore and the extruding die. Means is provided for rotating the head assembly relative to the body.

BRIEF DESCRIPTION OF THE DRAWINGS

FIG. 1 is a diagrammatic illustration of the apparatus of this invention with portions broken away to show the relationship of the elements;

FIG. 2 is a diagrammatic and enlarged cross-sectional view through the the extruder head assembly;

FIG. 3 is a diagrammatic end view of the extruding die;

FIG. 4 is a diagrammatic cross-sectional view of the extruding die taken along line 4—4 of FIG. 3 showing a portion of the helical vains and intervening valleys;

FIG. 5 is a diagrammatic end view of the die taken along line 5—5 of FIG. 4; and FIG. 6 is a diagrammatic flat development view of the helical vains illustrating their angle shape with respect to the axial centerline of the die.

BEST MODE FOR CARRYING OUT THE INVENTION

With reference to the drawings, particularly FIGS. 1 and 2, an apparatus 10 of the type suitable for extruding viscous material containing discontinuous reinforcing fibers is disclosed. The extruding apparatus 10 has an inlet end 12, an outlet end 14, and a barrel or extruding body 16. The extruding body 16 has an inner body surface 18 defining a body bore 20 having a central axis 22, a pilot hub 24 defining an outer cylindrical pilot surface 26 in axial alignment with the body bore, an outwardly projecting flange 28 having a mounting surface 30, and an inlet passage 32 opening into the body bore. The inlet passage 32 is connected to a source for supplying viscous material, as is known in the art.

The extruding apparatus 10 further includes a helicoid assembly 36 having a helicoid bore 38 in axial alignment with the axis 22 of the body bore 20. The helicoid assembly 36 includes a tubular nose 39 having an outer cylindrical surface 40 defining a preselected diameter and a distal end 42.

The apparatus 10 includes an extruder head assembly 44 rotatably connected to the extruding body 16. The extruder head assembly 44 includes a generally tubular die support member 46, a die sleeve 48, an extruding die 50, a lock ring 52, and means 54 for rotating the extruder head assembly relative to the extruding body 16.

The tubular die support member 46 is rotatably fixed to the extruding body 16 by a retaining ring 56 which is secured to the mounting surface 30 of the extruding body 16. The support member 46 is axially supported by a thrust bearing 58. The die sleeve 48 is threadably connected to the support member 46.

The die sleeve 48 has an inner peripheral stepped surface 60 having a die sleeve shoulder 62 and an axial elongate key 64.

As best shown in FIGS. 3, 4, and 5 the extruding die 50 has a die body 68 having a die inlet end 70 and a die outlet end 72, an outer cylindrical die stepped surface 74 having a die shoulder 76 and an axial external elongate die keyway 78. The die body 68 further defines a die extruding passage 80 for receiving the helicoid assembly 36. The extruding die 50 is connected to and rotatable with the rotating extruder head assembly 44. The outer cylindrical die stepped surface 74 is slidably disposed in the inner cylindrical stepped surface 60 of the die sleeve 48 with the key 64 of the die sleeve engaging with the keyway 78 of the extruding die 50 and the die shoulder 76 and the sleeve shoulder 62 in abutting relationship. The die extruding passage 80 further defines a generally cylindrical surface 82 defining an exit diameter 84 having a predetermined cross-sectional area. The die extruding passage 80 is in axial alignment with the helicoid bore 38. The conical extruding passage 80 is generally conical decreasing in diameter in a direction toward the outlet end 72 of the extruding die 50.

A plurality of helical vanes 90 extend inward from the extruding passage 80. In a preferred example, as shown in FIG. 3 there are four helical vanes 90 equally spaced peripherally around the conical extruding passage 80. As shown in the flat development view of FIG. 6, the helical vanes 90 are disposed at a helix angle "A" of from 40 to 70 degrees relative to the axial center line of the extruding die 50. A helix angle higher or lower would deviate from the desired angle sufficiently to negatively affect hose performance. Preferably the vanes 90 are disposed at a helix angle "A" of approximately 55 degrees and decrease in width "W" toward the outlet end 72 of the extruding die 50.

The means 54 for rotating the extruder head assembly 44 relative to the extruding body 16 includes a sprocket wheel 94 operatively connected to the support member 46 by a plurality of capscrews 96 and an endless chain 98 encircling the sprocket wheel.

A mandrel 100 extends coaxially through the helicoid bore 36 and the die extruding passage 80. The mandrel 100 is axially movable toward the outlet end 14 of the apparatus 10 as is known in the art with the viscous material being extruded about the mandrel and the mandrel later removed from the formed hose liner.

Industrial Applicability

The polymeric material containing the discontinuous reinforcing fibers is distributed around the helicoid assembly 34 in a conventional manner. The conical passage 80 of the extruding die 50 is configured to channel the molten material around the outer peripheral surface of the continuously moving mandrel 100. The helical vanes 90 of the extruding die 50 create a plurality of channels whereby the discontinuous reinforcing fibers within the viscous material orientate themselves generally parallel with the flow of the material. In the preferred embodiment the angle of the fibers, with reference to the longitudinal axis of the mandrel, is maintained within the range of approximately 40° to 70° and preferably at an angle of approximately 54° 44' which is the mathematical, theoretical desirable angle for fiber reinforcing. An angle of the fabrics higher or lower would deviate from the desired angle sufficiently to negatively affect hose performance. Other aspects, objects, and advantages of this invention can be obtained from a study of the drawings, the disclosure, and the appended claims.

We claim:

1. An apparatus for extruding a hose liner made of a viscous material containing discontinuous reinforcing fibers, said extruding apparatus having an inlet end, an outlet end, a main body having an inner body surface defining a body bore having an axis, an inlet passage opening into said body bore, a mandrel, and a helicoid assembly being mounted along the axis of the body bore, the apparatus further comprising;

an extruder head assembly rotatably connected adjacent the outlet end to the body;

an extruding die having a die body, said die body defining an extruding passage, said extruding passage defined by an inner surface including a generally cylindrical surface adjacent the outlet end, said cylindrical surface defining an exit diameter having a preselected cross-sectional area, and a generally conical surface decreasing in diameter towards the outlet end of the apparatus until the generally conical surface connects to the exit diameter, said extruding passage defining an extruding space in communication with the body bore and said inlet passage so that viscous material is extruded onto the mandrel from the extruding passage, said helicoid assembly including a tubular nose defining a helicoid bore, an outer peripheral cylindrical surface and a distal end, said helicoid bore being in axial alignment with the axis of the body bore, said outer peripheral surface defining a preselected diameter, said nose being disposed within the extruding passage of the extruding die with the distal end being adjacent said exit diameter, said extruding die being connected to and rotatable with the rotating extruder head assembly;

a plurality of helical vanes connected to and extending from the die body inward into the extruding passage for spirally orientating discontinuous reinforcing fibers within the viscous material, said helical vanes being disposed at a helix angle in the range of about 40 to about 70 degrees with respect to the axial center line of the extruding die and said helical vanes reducing in width toward the exit diameter;

said mandrel extending coaxially through the helicoid bore and the extruding die passage, said mandrel being axially moveable toward the outlet end of the apparatus; and means for rotating the extruder head assembly relative to the extruding body.

2. An extruding apparatus, as set forth in claim 1, wherein there are four helical vanes.

3. An extruding apparatus, as set forth in claim 1, wherein the vanes are disposed at a helix angle of 55 degrees.

4. An extruding apparatus, as set forth in claim 1, wherein the extruding head assembly includes a generally tubular die support member rotatably fixed to the main body by a retaining ring which is secured to the body and the means for rotating the rotating head assembly with respect to the main body includes a sprocket wheel operatively connected to the support member by a plurality of capscrews and an endless chain encircling the sprocket.

\* \* \* \* \*